May 30, 1933.  E. L. KRAFT  1,912,281
OPERATING DEVICE FOR WINDSHIELD VENTILATORS
Original Filed Jan. 18, 1929   2 Sheets-Sheet 1
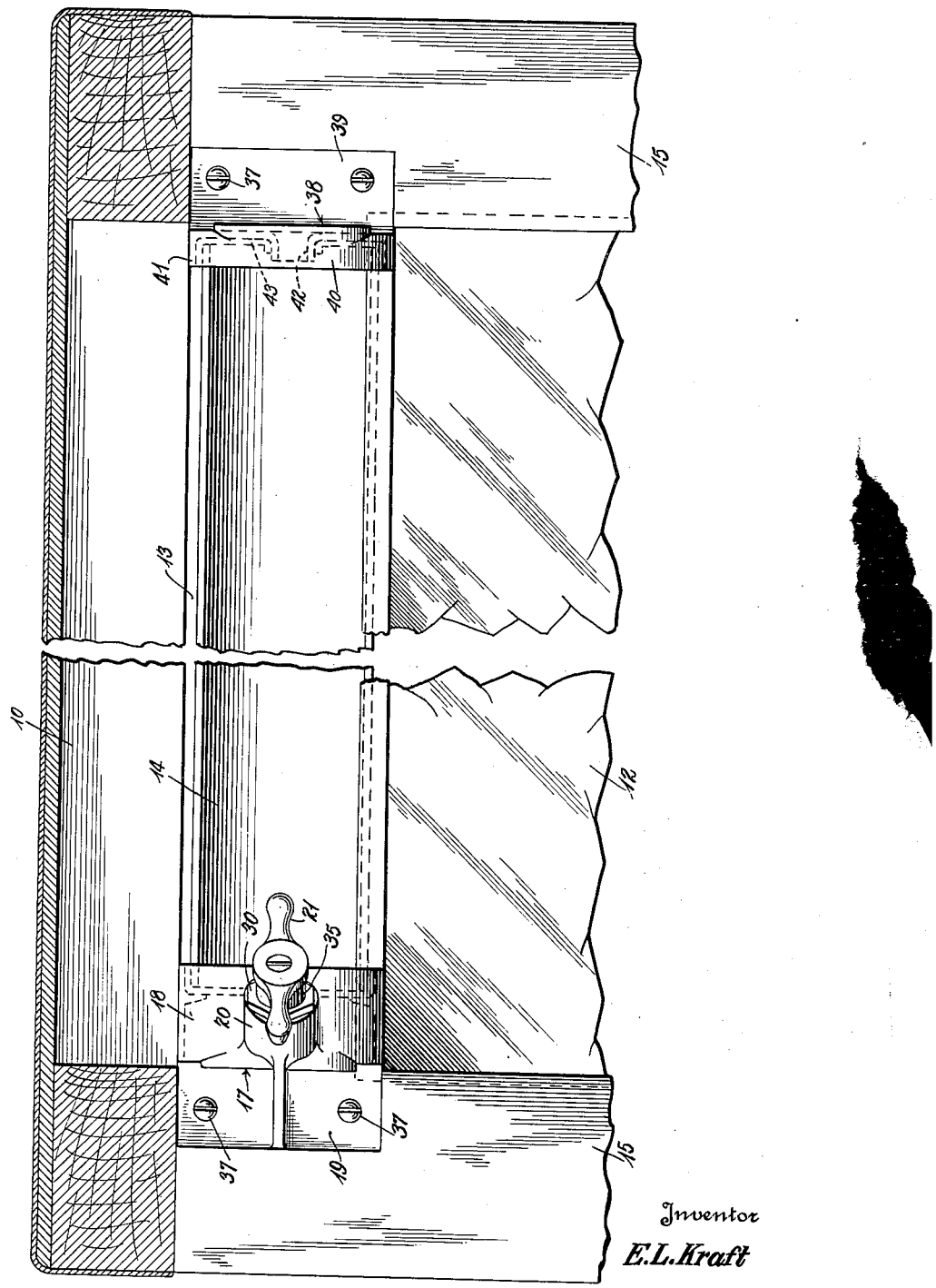
Inventor
E. L. Kraft
By Bacon + Thomas
Attorneys

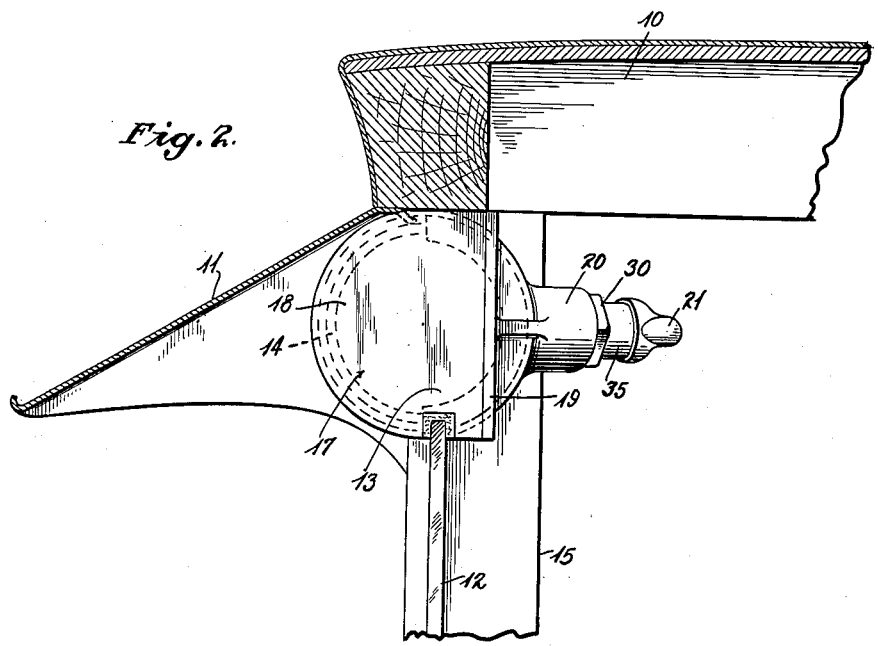
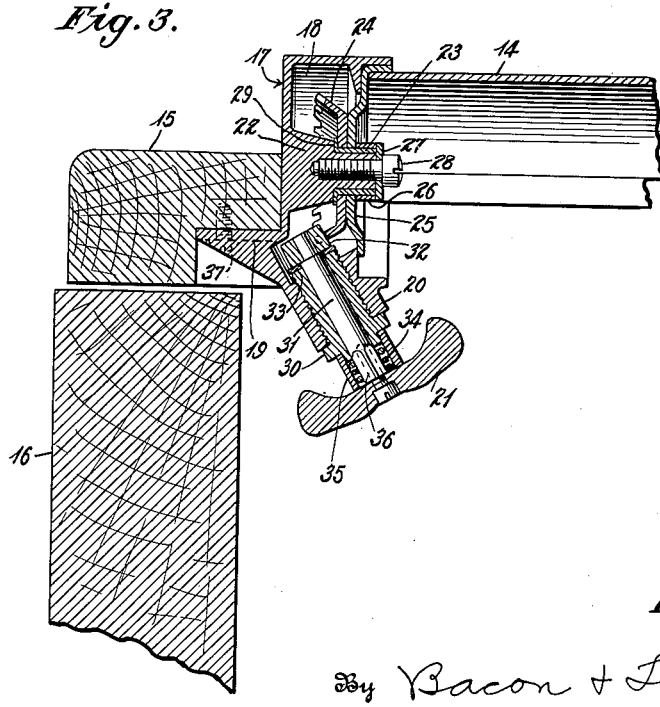

Patented May 30, 1933

1,912,281

UNITED STATES PATENT OFFICE

EDWARD L. KRAFT, OF YORK, PENNSYLVANIA, ASSIGNOR TO MARTIN-PERRY CORPORATION, OF YORK, PENNSYLVANIA, A CORPORATION OF DELAWARE

OPERATING DEVICE FOR WINDSHIELD VENTILATORS

Application filed January 18, 1929, Serial No. 333,252. Renewed January 27, 1933.

This invention relates to operating devices for windshield ventilators, and more particularly to the type adapted for the simple and convenient adjustment of the ventilation opening.

It is a general object of the invention to simplify and improve the construction and operation of devices of this character.

A further object of the invention is to provide a positive control of the ventilation openings.

Other objects and features of novelty will be apparent as the following description proceeds, as taken in connection with the accompanying drawings, in which Fig. 1 is a vertical elevation showing one embodiment of the invention as it appears from the interior of the car;

Fig. 2 is an end view of the structure shown in Fig. 1; and

Fig. 3 is a horizontal cross section showing the details of construction of the elements shown in Figs. 1 and 2.

Referring more particularly to the drawings, the invention is illustrated in connection with a ventilator for an automobile having a closed body, such as a sedan, coupé, or the like. The automobile body comprises a top 10, a visor 11, and a windshield 12 which terminates short of the top 10, leaving therebetween a ventilation opening 13 which extends horizontally across the top of the windshield. A cylindrical trough-like member 14 constitutes the ventilation closure, and is adapted when closed to cut off the entire opening 13. The windshield and ventilator are mounted between corner posts, one of which is indicated at 15, and against which a door 16 is adapted to abut when in the closed position.

For pivotally mounting the ventilator in the ventilation opening, a housing 17 is provided. This housing comprises generally a hollow cylindrical portion 18 having a short horizontal axis, a vertical flange 19 by which the housing is secured to the corner post or body pillar 15, and a boss 20 in which is journaled an operating handle 21. The cylindrical portion 18 is provided with a central boss 22 which serves as a journal for the rotating parts of the ventilator. The boss 22 carries a bearing sleeve 23 on which are mounted a beveled gear 24, and an end member 25 of the closure member 14. The gear 24 and the member 25 are rigidly secured together in any desired manner, so that any movement applied to the gear will turn the member 25 and so adjust the ventilator 14. A spacing collar 26 abuts against the member 25 and is held in place by a washer 27, in turn secured by a machine screw 28 threaded in the boss 22. An inner shoulder 29 is provided on the boss, and the gear 24, member 25, and sleeve 26 are retained between the shoulder 29 and the washer 27.

The boss 20 is provided with an elongated threaded plug 30 in which is snugly journaled the stem 31 of the operating handle 21. Rigidly secured to the inner end of the stem 31 is a pinion 32 which is adapted to mesh with the gear 24. The teeth of the gear and pinion are designed to give a gear ratio of four-and-one-half to one, in the embodiment disclosed, although other ratios are contemplated within the purview of the invention. Friction material 33 is interposed between the pinion 32 and the inner end of the plug 30, so that the parts will remain in any position of adjustment. A tension spring 34 is interposed between the plug 30 and the handle 21, and serves to regulate the tension on the friction material. A cap 35 is provided to exclude dust and dirt from the spring 34. The stem 31 is provided with a squared end 36 so that a firm mounting may be provided for the handle 21 which in the embodiment shown takes the form of a thumb screw.

It should be noted that the stem 31 is on an angle to the pivotal axis of the ventilator 14. This arrangement provides a very convenient operation from the interior of the car. Furthermore, it should be noted that the threaded plug 30 is larger than the pinion 32 so that the entire pinion and handle assembly may be put together as a unit, and the unit installed in the device by merely threading in the plug 30.

The entire device is supported from the framework of the car by screws 37 or other fastening means which secure the flange 19 to the body pillar or corner post 15. The operating device may be at either end of the ventilator as desired, but as the left hand drive is at present the most popular, the operating handle 21 has been shown at the left hand side of the ventilator, within easy reach of the driver of the car. The other end of the ventilator is supported by a bracket 38 having a flange 39, similar to the flange 19, by which it is secured to the framework of the car. This bracket has an upstanding flange 40 provided with an annular rim 41 and a central boss 42. A brass ferrule 43 is journaled on the boss 42, and constitutes the closure for this end of the ventilator member 14.

While one embodiment of the invention has been shown and described in comparative detail for the purpose of adequate disclosure, the scope of the invention is not limited to any of the details disclosed, but includes such modifications and embodiments of the broad idea as come within the scope of the appended claims.

Having thus described the invention, what I claim as new and desire to secure by Letters Patent of the United States is:

1. A device for operating ventilators for closed car bodies, comprising in combination with a cylindrical trough-shaped ventilator, a bevel gear secured to the end of said ventilator, an operating handle mounted at an angle to the axis of said cylindrical member, and a pinion on said operating handle meshing with said gear.

2. A device for operating ventilators for closed car bodies, comprising in combination with a ventilator pivoted on a horizontal axis, a bevel gear rigid with said ventilator, an operating handle mounted for rotation about an axis at an acute angle to the pivotal axis of said ventilator and a bevel pinion rigidly mounted on said handle in mesh with said gear.

3. In combination with a closed car body having a windshield glass and a ventilator comprising a member pivoted in an elongated horizontal opening having an edge of the windshield glass forming one margin thereof, an operating handle mounted in an angle formed by the windshield and the body and rotatable about an axis other than and oblique to the pivotal axis of said member; the axes of said ventilator and handle being in a common horizontal plane, and means for transmitting rotary motion from said handle to said member.

4. In combination with a closed car body having a windshield ventilator which in closed position lies outside or inside of the plane of the windshield, a gear rigid with said ventilator, and means for turning said gear from a position inside said windshield.

5. In combination with a closed car body having a windshield ventilator which in closed position lies outside or inside of the plane of the windshield, a gear rigid with said ventilator, and means for turning said gear from a position inside said windshield comprising a thumbscrew, a stem, and a pinion on said stem.

6. A device of the character described comprising in combination a housing having a cylindrical portion, and a boss, a ventilator and its operating gear journaled in said cylindrical portion, an operating handle having a stem journaled in said boss, and a pinion on said stem in mesh with said gear.

7. A device of the character described comprising in combination, a housing, a ventilator and its operating gear rotatably journaled in said housing, an operating handle having a stem journaled in said housing, and a pinion on said stem in mesh with said gear, said stem and pinion having an axis at an oblique angle to the axis of said housing and ventilator with its gear.

8. A device of the character described comprising in combination, a housing having a supporting flange, a cylindrical portion, and a boss, a ventilator and an operating gear journaled in said cylindrical portion, an operating handle having a stem journaled in said boss, a pinion on said stem in mesh with said gear, friction means associated with said gear for retaining it in position, and tension means associated with said stem for regulating said friction means.

9. In combination with a windshield ventilator, a housing having an arcuate rim, a ventilator pivoted on said housing for movement within said rim, a gear rigidly secured to said ventilator, a boss on said housing having a threaded plug, an operating stem journaled in said plug, a pinion rigidly secured to one end of said stem and adapted to mesh with said gear and handle on the other end of said stem, said plug being of greater diameter than said pinion, whereby said pinion, stem and handle may be assembled outside of said housing.

10. In combination with a closed car body ventilator mounted above the windshield thereof, transmission means including a plurality of elements located at one end of said ventilator and in a corner formed by one side, the top and the windshield of the car body for moving said ventilator, a shaft for operating said transmission means, and a handle for manually turning said shaft, said shaft projecting diagonally from said side and windshield to permit said handle to clear the confines of said corner.

11. A device for operating automobile ventilators, comprising in combination a gear secured to the end of the ventilator, an operating shaft mounted at an angle to the axis of said ventilator, a pinion on said operating shaft meshing with said gear, and manual means for turning said shaft to open and close said ventilator.

12. A mounting for a windshield ventilator and its operating device, comprising a housing having a cylindrical portion formed with a mounting flange, and two angularly arranged bosses, one of said bosses being formed with a support for a bearing sleeve and the other boss being formed with a bore for receiving a bearing plug.

13. A mounting for a windshield ventilator and its operating device, comprising a housing having a cylindrical portion formed with a mounting flange, and two angularly arranged bosses, one of said bosses being formed with a support for a bearing sleeve and the other boss being formed with a bore for receiving a bearing plug, a bearing sleeve fastened to the said supporting portion of the first mentioned boss, and a bearing plug threaded into the bore of the second mentioned boss.

14. A mounting for a windshield ventilator and its operating device, comprising a housing having a cylindrical portion formed with a mounting flange, and two angularly arranged bosses, one of said bosses being formed with a support for a bearing sleeve including a reduced cylindrical part having a shoulder at one end, and the other boss being formed with a bore for receiving a bearing plug.

15. A mounting for a windshield ventilator and its operating device, comprising a housing having a cylindrical portion formed with a mounting flange, and two angularly arranged bosses, one of said bosses being formed with a support for a bearing sleeve including a reduced cylindrical part having a shoulder at one end, and the other boss being formed with a bore for receiving a bearing plug, a bearing sleeve fitted on the cylindrical part of the first mentioned boss and bearing against the said shoulder, and a bearing plug fastened in the bore of the second mentioned boss.

16. A mounting for a windshield ventilator and its operating device, comprising a housing having a cylindrical portion formed with a mounting flange, and two angularly arranged bosses, one of said bosses being formed with a support for a bearing sleeve including a reduced cylindrical part having a shoulder at one end, and the other boss being formed with a bore for receiving a bearing plug, a bearing sleeve fitted on the cylindrical part of the first mentioned boss and bearing against the said shoulder, a spacing collar encircling the outer end portion of the bearing sleeve, said sleeve and collar being held in place by a device threadedly connected to their respective boss, and a bearing plug fastened in the bore of the second mentioned boss.

17. A mounting for a windshield ventilator and its operating device, comprising a housing having a shallow cylindrical portion formed with a flange adapted to be secured to a corner post of the car body, and two angularly arranged bosses, one of said bosses being formed with a support for one end of the ventilator body and its operating element, and the other of said bosses being formed with a bore for receiving the support for an actuating mechanism for the operating element of said ventilator body.

18. An operator for vehicle ventilators comprising, a ventilator movable about a fixed axis, a beveled gear mounted on said ventilator, to move therewith, an operating member mounted at an angle to the said axis of the ventilator, a pinion on said operating member meshing with said gear, and a housing for enclosing and supporting one end portion of the ventilator and the remaining mentioned elements.

19. An operator for vehicle ventilators comprising, a ventilator rotatable about a fixed axis, driven means mounted on the ventilator to rotate therewith, an operating handle mounted for rotation about an axis at an acute angle to the said axis of the ventilator, means carried by the handle for driving said driven means, and a housing for enclosing and supporting one end portion of the ventilator and the driven and handle actuated means.

20. In combination with a car body having a ventilator which moves between two closed positions lying on opposite sides of a single vertical plane, a driven member rigid with the ventilator, and means for moving the ventilator comprising a rotatable stem, an operator for the stem, a means on the stem for driving the driven member, and a housing for enclosing and supporting one end portion of the ventilator, the driven member, the rotatable stem and the driving member.

21. An operator for vehicle ventilators comprising, a ventilator movable about a fixed axis, a beveled gear mounted on said ventilator, an operating member mounted at an angle to the said axis of the ventilator, a pinion on said operating member meshing with said gear, friction means engaging said pinion, means associated with the operating member for regulating said friction means, and a housing for enclosing and supporting one end portion of the ventilator, the gear and pinion, and the friction means.

22. An operator for vehicle ventilators comprising, a ventilator movable about a fixed axis, a beveled gear secured to the ventilator, an operating member supported by a bearing at an angle to the said axis of the ventilator, a pinion on said operating member meshing with said gear, a friction means engaging said bearing and pinion for preventing undesired movement of the ventilator, and a housing for supporting and enclosing an end portion of the ventilator, the gear and pinion, the bearing and the friction means.

23. An operator for vehicle ventilators comprising a ventilator rotatable about a fixed axis, driven means fixed to the ventilator to rotate therewith, an operating handle mounted for rotation about an axis at an acute angle to the said axis of the ventilator, means carried by the handle for driving said driven means, friction means associated with said driving and driven means, means for regulating said friction means, and a housing for supporting and enclosing an end portion of the ventilator, the driven means, the means carried by the handle, and the friction means.

24. An operator for vehicle ventilators comprising, a ventilator rotatable about a fixed axis, driven means fixed to the ventilator to rotate therewith, an operating handle mounted for rotation about an axis at an acute angle to the said axis of the ventilator, means carried by the handle for driving said driven means, friction means associated with the driving means carried by the handle, means associated with the handle for regulating said friction means, and a housing for supporting and enclosing an end portion of the ventilator, the driven means, the means carried by the handle, and the friction means.

25. An operator for vehicle ventilators comprising a ventilator rotatable about a fixed axis, driven means fixed to the ventilator to rotate therewith, an operating handle mounted for rotation about an axis at an acute angle to the axis of the ventilator, means carried by the handle for driving said driven means, friction means for preventing undesired movement of the ventilator, and a housing for supporting and enclosing an end portion of the ventilator, the driven means, the means carried by the handle, and the friction means.

26. A mounting for a ventilator adapted to be positioned above a windshield glass, comprising a housing, means for attaching the housing to a support, a bearing for a ventilator mounted in the housing, and a bearing for a ventilator operating device mounted in the housing.

27. Ventilating means for an automobile of the closed body type comprising in combination with a frame structure defining an opening in a body wall, of a glass panel for bridging a portion only of said opening and having an edge thereof terminating in spaced relation with respect to one side of said frame structure, said edge having mounted thereon a channeled sealing member unattached to said frame structure, a pivoted ventilator member for controlling the passage of air through the portion of said opening not bridged by said glass panel, said ventilator member being pivotally mounted on opposed portions of the frame structure to move about an axis arranged intermediate the opposite edges of said member, the ventilator member, when in a closed position, entirely bridging its portion of the said opening with one edge engaging the channeled sealing member and with its opposite edge cooperating with the portion of the frame structure opposed to said glass panel edge, gearing means for moving said ventilator member between its closed and opened positions, and an operating handle connected to the gearing means for operating the latter, the ventilator and its pivotal mounting being constructed and arranged with respect to said frame structure to cause the edge of the ventilator member cooperating with said sealing member to move outwardly of the body wall and the remaining edge to move inwardly of said wall when the member is moved from a closed position to an opened position.

28. Ventilating means for an automobile of the closed body type comprising in combination with the marginal parts which form an opening in a body wall, of a glass panel for bridging a portion only of said opening and having an edge thereof terminating in spaced relation with respect to one of said marginal parts, a pivoted ventilator member positioned in the space not bridged by the panel, said ventilator member being pivotally mounted on opposite marginal parts to move about an axis arranged intermediate the opposite edges of said member, the ventilator member when in a closed position entirely bridging its portion of said opening with one of its said edges cooperating with the aforementioned edge of said panel and with its opposite edge cooperating with the portion of the frame structure opposed to said glass panel edge, gearing means for moving said ventilator member between its closed and opened positions, and an operating handle connected to the gearing means for operating the latter.

29. Ventilating means for an automobile of the closed body type comprising in combination with the marginal parts which form an opening in an automobile body wall, of a glass panel for bridging a portion only of said opening and having an edge thereof terminating in spaced relation with respect to one of said marginal parts, a pivoted ventilator member positioned in said space not bridged by said panel, said ventilator member being pivotally mounted on opposite marginal parts to move about an axis located between opposite edges of said member, the ventilator member being capable of movement between two closed positions located on opposite sides of the glass panel, with one of the opposite free edges of the said member cooperating with the aforementioned edge of the glass panel while in either of its closed positions, and a gearing mechanism for operating the ventilator member.

30. Ventilating means for an automobile of the closed body type comprising in combination with the marginal parts which form an opening in a body wall, of a glass panel for bridging a portion only of said opening and having an edge thereof terminating in spaced relation with respect to one of said marginal parts, a pivoted ventilator member positioned in said space not bridged by the panel, said ventilator member being pivotally mounted on opposite marginal parts to move about an axis located intermediate opposite edges of said member, the ventilator member, when in a closed position, entirely bridging its portion of the opening, with one of its said edges cooperating with the aforementioned edge of said panel and with its opposite edge cooperating with the portion of the frame structure opposed to said glass panel edge, said ventilator member being movable into an opened position which will cause air to flow over a surface of the glass panel, and gearing means for operating the ventilator member.

31. Ventilating means for an automobile of the closed body type comprising in combination with the marginal parts which form an opening in an automobile body wall, of a glass panel for bridging a portion only of said opening and having an edge thereof terminating in spaced relation with respect to one of said marginal parts, and a pivoted ventilator member positioned in said space not bridged by said panel, said ventilator member being pivotally mounted on opposite marginal parts to move about an axis located between opposite edges of said member, said ventilator member being movable into an opened position which will cause air to flow over a surface of the glass panel, and gearing means for operating the ventilator member.

32. Ventilating means for an automobile of the closed body type comprising a body, a windshield glass panel therefor, said body having a ventilating opening formed in one of its walls and a ventilating member pivotally counted in said opening and movable into different positions to control the flow of air through said opening, said ventilator member being movable about an axis positioned intermediate opposite edges of the same to permit a portion of the said member to be arranged inside the body and inclined toward the plane of the windshield to control the direction of flow of air through said opening so that a stream of air will be caused to pass over the inner surface of said glass panel to prevent the accumulation of steam, frost, or the like, thereon.

33. Ventilating means for an automobile of the closed body type comprising a body, a transparent glass panel, said body having a ventilating opening formed in a wall thereof in close proximity to and co-extensive with one edge portion of said panel, and a ventilator member mounted in said opening to move about an axis arranged intermediate opposite edges of the same and substantially parallel with said panel edge, said member being positioned rearwardly of the panel and having a portion of the same inclined toward said panel to control the direction of flow of air during its movement between the interior and exterior of the body to cause at least a portion of the air to traverse the inner surface of said panel to prevent the accumulation of steam, frost, or the like, thereon.

34. Ventilating means for an automobile of the closed body type comprising in combination with an opening in a wall of said body, which has its margins formed by portions of said wall, of a transparent panel supported in said opening to bridge only a portion thereof to provide an unbridged space in said opening, a ventilator member pivotally mounted in said space to control the passage of air therethrough, a housing carried by one of the margin forming portions of said body wall, a pivot bearing for supporting one end of said member formed in said housing, gearing positioned in said housing and operatively connected to the said end of the member, an operating stem for the gearing journalled in the housing and projecting therefrom, and a handle fastened to the projecting end of the stem.

35. Ventilating means for an automobile of the closed body type, comprising a body, a windshield glass panel therefor, said body having a ventilating opening formed in one of its walls, a ventilating member pivotally mounted in said opening and movable into different positions to control the flow of air through said opening, a housing carried by the wall of the body which has the ventilating opening formed therein, a train of gears within the housing, an operative connection between said train of gears and said ventilating member, an operator for said train of gears to actuate said member therethrough, said ventilating member being movable about an axis positioned intermediate opposite edges of the same to permit a portion of said member to be arranged inside the body and inclined toward the plane of the windshield to control the direction of flow of air through said opening so that a stream of air will be caused to pass over the inner surface of said glass panel to prevent the accumulation of steam, frost, or the like, thereon.

In testimony whereof I affix my signature.

EDWARD L. KRAFT.